(12) United States Patent
Tsuyuzaki et al.

(10) Patent No.: US 8,141,937 B2
(45) Date of Patent: Mar. 27, 2012

(54) VEHICLE BODY STRUCTURE

(75) Inventors: Takumi Tsuyuzaki, Wako (JP); Toshizumi Yamaguchi, Wako (JP); Hiro Nushii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/145,031

(22) PCT Filed: Dec. 11, 2009

(86) PCT No.: PCT/JP2009/070735
§ 371 (c)(1),
(2), (4) Date: Jul. 18, 2011

(87) PCT Pub. No.: WO2010/095331
PCT Pub. Date: Aug. 26, 2010

(65) Prior Publication Data
US 2011/0278880 A1  Nov. 17, 2011

(30) Foreign Application Priority Data
Feb. 20, 2009 (JP) .................................. 2009-038213

(51) Int. Cl.
*B60J 7/00* (2006.01)
(52) U.S. Cl. .............. 296/187.12; 296/146.6; 296/97.22

(58) Field of Classification Search ............. 296/187.12, 296/187.11, 146.6, 97.22
See application file for complete search history.

(56) References Cited

U.S. PATENT DOCUMENTS
5,707,098 A * 1/1998 Uchida et al. .............. 296/146.6

FOREIGN PATENT DOCUMENTS
| EP | 1 361 140 | 11/2003 |
| JP | S50-38214 | 4/1975 |
| JP | H04-22378 | 2/1992 |

* cited by examiner

*Primary Examiner* — Joseph Pape
(74) *Attorney, Agent, or Firm* — Rankin, Hill & Clark LLP (57) ABSTRACT

A vehicle body structure capable of preventing a bumper beam of another vehicle from riding over the rear part of the vehicle body. A vehicle body structure (10) is provided with a rear side door (13) located forward of a rear wheel (17) with respect to the vehicle body, and the rear side door is provided with a rear door beam (21) extended in the front-and-rear direction of the vehicle body. The vehicle body structure is provided with a side member upper section (56) extending toward the rear of the vehicle body from a rear wheel arch (33) and provided on a line extended from the rear door beam (21), and also with a side member lower section (57) extending on a down grade from the rear section (67) of the side member upper section toward a lower rear section (33c) of the rear wheel arch (33).

5 Claims, 11 Drawing Sheets

VEHICLE BODY STRUCTURE

TECHNICAL FIELD

The present invention relates to a vehicle body structure including side doors disposed forward of rear wheels and door beams disposed in the side doors and extending in a front-and-rear direction of a vehicle body.

BACKGROUND ART

Vehicle bodies include rear frames extending in a front-and-rear direction thereof and arch-shaped upper frames disposed above the rear frames. The upper frames have rear end portions connected to rear end portions of the rear frames.

The arch-shaped upper frames bear bumper beams of other vehicles located at a higher level, when the vehicles collide with rear parts of the vehicle bodies, as disclosed in EP 1361140 A2 (Patent Literature 1 below).

However, such upper frames can be undesirably bent by the bumper beams as the bumper beams hit the upper frames. Then, the bumper beams can ride over the bent upper frames (i.e., the rear part of the vehicle bodies).

PRIOR ART LITERATURE

Patent Literature

Patent Literature 1: EP 1361140A2

SUMMARY OF INVENTION

Technical Problem

An object of the present invention is to provide a vehicle body structure designed to prevent a bumper beam of another vehicle from riding over a rear part of the vehicle body structure.

Solution to Problem

According to one aspect of the present invention, there is provided a vehicle body structure comprising: a side door disposed forward of a rear wheel; a door beam disposed in the side door and extending in a front-and-rear direction of a vehicle body; a rear wheel arch disposed above the rear wheel; and a bifurcated reinforcement frame comprising a side member including an upper side part and a lower side part, the upper side part extending from the rear wheel arch in a rearward direction of the vehicle body and disposed on an extended line of the door beam, the lower side part extending obliquely downward from a rear portion of the upper side part toward a rear part of the rear wheel arch.

Preferably, the vehicle body structure further comprises a filler guard disposed on the extended line and between the upper side part and the door beam for protecting a filler pipe.

Preferably, the vehicle body structure further comprises: a striker disposed rearward of the door beam for holding the side door in a closed position when the side door is in the closed position; and a striker transmission member disposed on the extended line and between the striker and the filler guard for transmitting a load to the striker.

Preferably, the side door is a rear side door and the door beam is a rear door beam disposed in the rear side door, and wherein the vehicle body structure further comprises a front side door disposed forward of the rear side door and a front door beam disposed in the front side door and extending in the front-and-rear direction of the vehicle body, the front door beam having a rear end portion disposed in the vicinity of a front end portion of the rear door beam and on the extended line.

Preferably, the vehicle body structure further comprises: a rear frame disposed on a side of a center of width of a vehicle and extending alongside the lower side part in the front-and-rear direction of the vehicle body; and a connection frame interconnecting the rear frame and a front portion of the lower side part and extending in a widthwise direction of the vehicle.

Advantageous Effects of Invention

The upper side part of the side member extends from the rear wheel arch in the rear direction of the vehicle body and is disposed on the extended line of the door beam. One part of a load applied to a rear part of the vehicle body when a bumper beam of another vehicle located higher than a rear bumper beam of the vehicle body structure of the present invention collides with the rear part is transmitted through the upper side part to the door beam. As a result, the one part of the load can be efficiently borne by the door beam without a passenger compartment being deformed.

The lower side part of the side member extends obliquely downward from the rear portion of the upper side part toward the rear part of the rear wheel arch. The lower side part bears a bumper beam of another vehicle located higher than the rear bumper beam of the vehicle body structure when the bumper beam collides with the rear part of the vehicle body. The lower side part directs the bumper beam downward, preventing the bumper beam from riding over the rear part (i.e., the rear wheel) of the vehicle body.

The lower side part is deformed by the bumper beam hitting the lower side part. The deformation of the lower side part lowers a rear end portion of the lower side part and a rear end portion of the upper side part.

When lowered, the rear end portion of the upper side part hits a top of another vehicle (i.e., a top of a front side frame of the vehicle), thereby pushing the bumper beam downward. As the bumper beam is pushed downward, a lower bulkhead of the vehicle hits a top of a rear frame of the vehicle body structure of the present invention.

The lower bulkhead is so rigid as to support a cooling member (for example, a radiator). Such a rigid bulkhead deforms the rear frame of the vehicle body structure by hitting the top of the rear frame. The deformation of the rear frame absorbs impact energy.

It will be appreciated that a bumper beam of another vehicle located at the same level as the rear bumper beam of the vehicle body structure collides with the rear part of the vehicle body, the rear frame bears impact energy, as does a conventional vehicle body structure.

The reinforcement frame comprising the side member including the upper and lower side parts allows for increase in rigidity of the vehicle body structure.

The filler guard is disposed between the upper side part and the door beam and on the extended line. One of a load applied to the rear part of the vehicle body when a bumper beam of another vehicle located higher than the rear bumper beam of the vehicle body structure collides with the rear part is transmitted through the upper side part and the filler guard to the door beam. The one part of the load is efficiently borne by the door beam without the passenger compartment being deformed.

The filler guard disposed between the upper side part and the door beam protects the filler pipe.

The vehicle body structure further comprises the striker disposed rearward of the door beam and the striker transmission member disposed between the striker and the filler guard and on the extended line of the door beam. One part of a load applied to the rear part of the vehicle body when a bumper beam of another vehicle located higher than the rear bumper beam of the vehicle body structure collides with the rear part is transmitted through the upper side part, the filler guard, the striker transmission member and the striker to the door beam. The one part of the load is efficiently borne by the door beam without the passenger compartment being deformed.

The vehicle body structure further comprises the front door beam having the rear end portion disposed in the vicinity of the front end portion of the rear door beam. The front door beam is disposed on the extended line. One part of a load applied to the rear end of the vehicle body when a bumper beam of another vehicle located higher than the rear bumper beam of the vehicle body structure collides with the rear part of the vehicle body is transmitted through the upper side part of the side member, the filler guard, the striker transmission member, the striker and the rear door beam to the front door beam.

The one part of the load is efficiently borne by the rear door beam and the front door beam without the passenger compartment being deformed. Accordingly, a trunk can have its sufficient space because it is not necessary to make frames of the trunk more rigid enough to prevent the deformation of the passenger compartment.

The lower side part of the side member is connected through the connection frame to the rear frame. The lower side part bears a bumper beam of another vehicle located higher than the rear bumper beam of the vehicle body structure when the bumper beam collides with the rear part of the vehicle body. The lower side part then pushes the vehicle (the front side frame of the vehicle) downward, allowing the rear frame to be deformed by the front side frame for absorbing impact energy.

MODE FOR CARRYING OUT THE INVENTION

A certain preferred embodiment of the present invention is described below with reference to the accompanying drawings.

Figure 1:
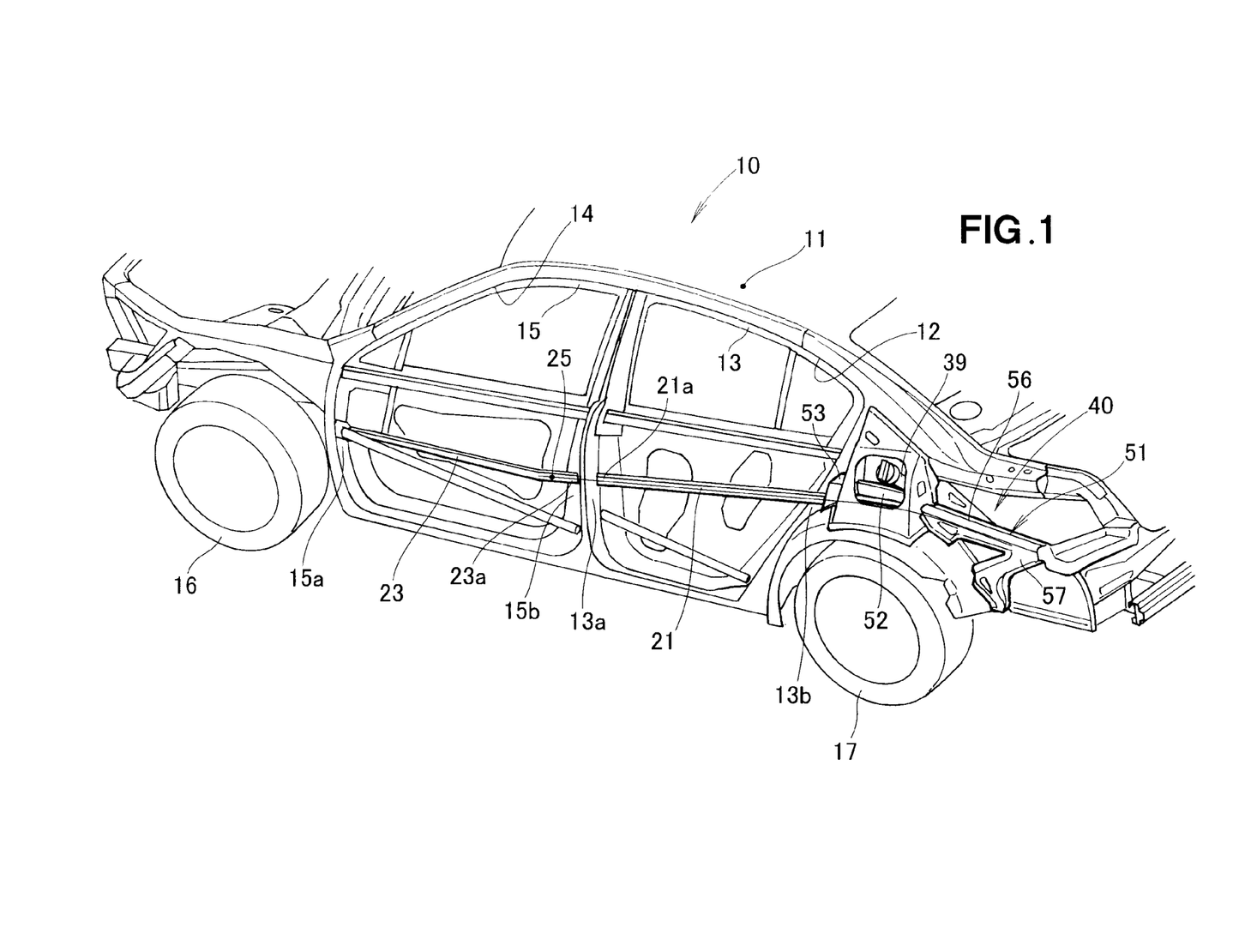
FIG. 1 is a perspective view of a vehicle body structure according to the present invention.

As shown in FIG. 1, a vehicle body structure 10 includes a vehicle body frame 11. The vehicle body frame 11 has a rear opened part 12 and a front opened part 14. A rear side door (side door) 13 is provided on the rear opened part 12 in such a manner as to move between opened and closed positions. A front side door (side door) 15 is provided on the front opened part 14 in such a manner as to move between opened and closed positions. Front wheels 16 and rear wheels 17 are provided on front and rear sides of the vehicle body frame H.

The rear side door 13 is disposed forward of the rear wheel 17. Disposed in the rear side door 13 are a rear reinforcing door beam (door beam) 21 and a lock part (not shown) for locking the rear side door 13. The rear door beam 21 extends between and interconnects front and rear ends 13a, 13b of the rear side door 13. The rear door beam 21 is shown extending in a front-and-rear direction of a vehicle body with the rear opened part 12 closed by the rear side door 13. The lock part in the rear side door 13 is designed to engage a rear striker (striker) 74 (FIG. 2) with the rear opened part 12 closed by the rear side door 13.

The front side door 15 is disposed forward of the rear side door 13. Disposed in the front side door 15 are a front reinforcing door beam 23 and a lock part (not shown) for locking the front side door 15. The front door beam 23 extends between and interconnects front and rear ends 15a, 15b of the front side door 15. The front door beam 23 is shown extending in the front-and-rear direction of the vehicle body with the front opened part 14 closed by the front side door 15.

The front door beam 23 has its rear end portion 23a disposed proximate a front end portion 21a of the rear door beam 21. The rear end portion 23a of the front door beam 23 is also disposed on an extended line 25 of the rear door beam 21, or in alignment with a longitudinal axis of the rear door beam 21. The lock part of the front side door is designed to engage a front striker (not shown) with the front opened part 14 closed by the front side door 15.

Figure 2:
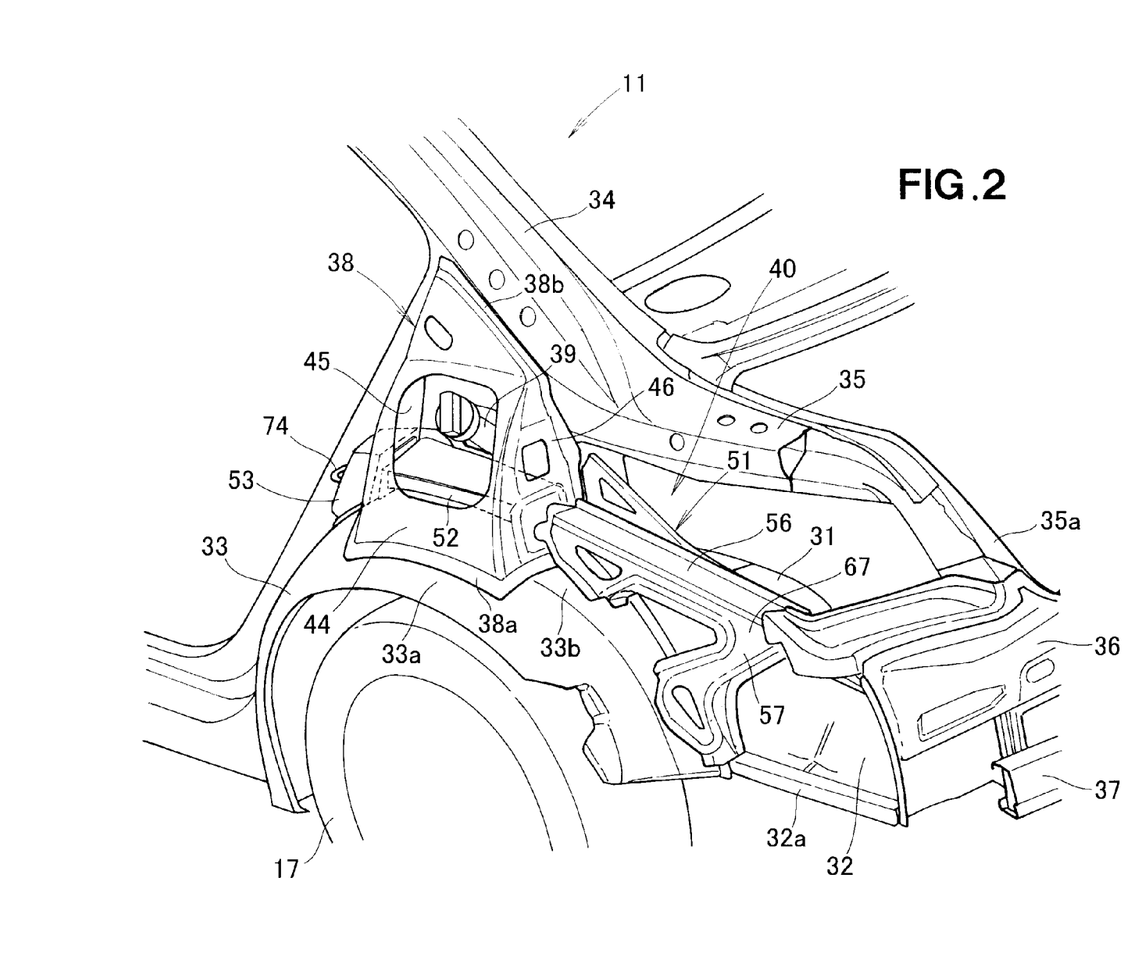
FIG. 2 is a perspective view of a reinforcement frame of the vehicle body structure shown in FIG. 1 and the surroundings of the reinforcement frame.
Figure 3:
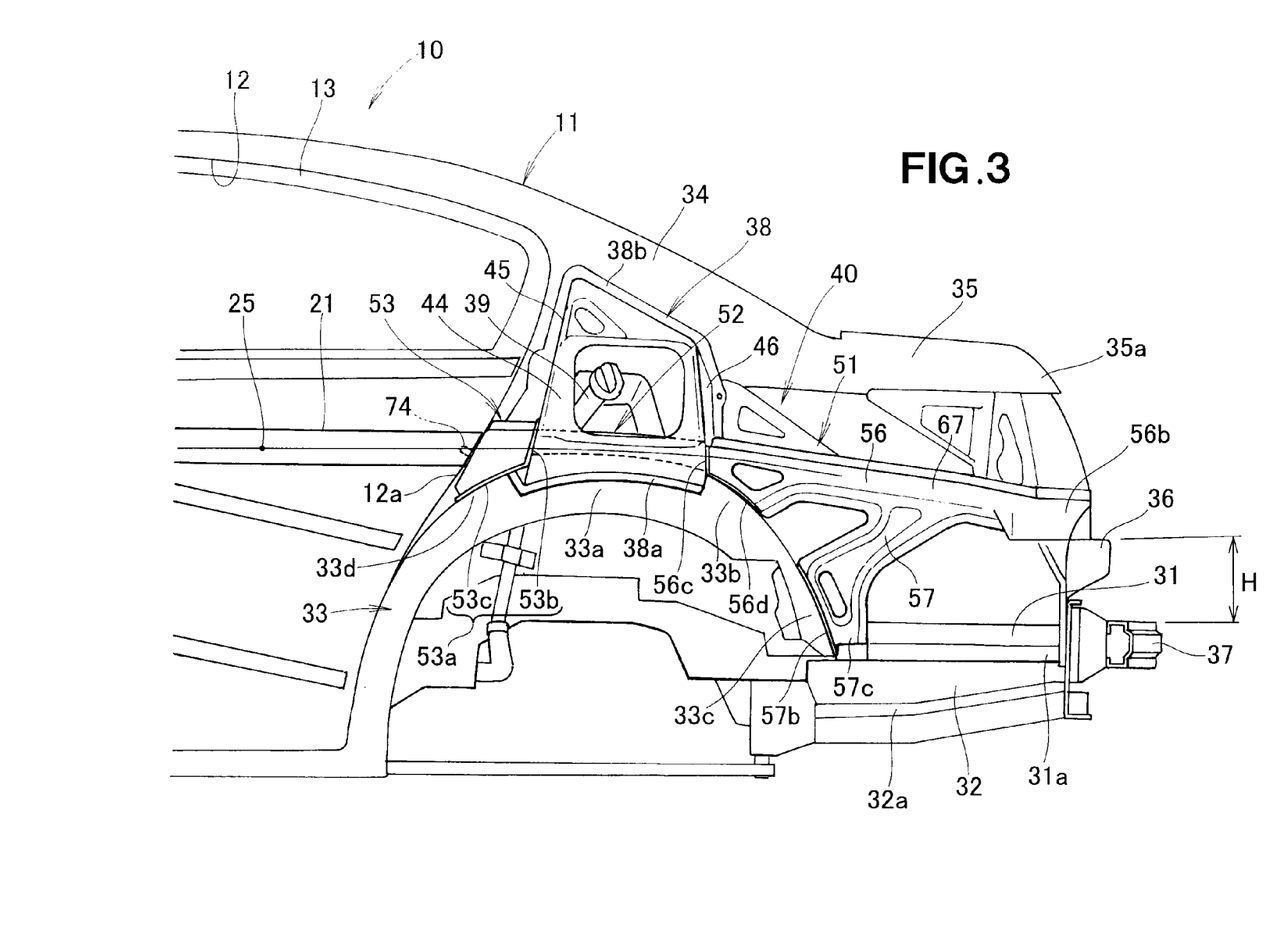
FIG. 3 is a side elevation view of the vehicle body structure shown in FIG. 1.

As shown in FIGS. 2 and 3, the vehicle body frame 11 includes a rear frame 31 extending in the front-and-rear direction of the vehicle body, a floor panel 32 disposed on the rear frame 31, a rear wheel arch (rear wheel house) 33 disposed on the rear frame 31 and the floor panel 32, a rear pillar 34 disposed above the rear wheel arch 33, a rear member 35 extending from the rear pillar 34 in a rearward direction of the vehicle body, a rear cross member 36 connected to a rear end portion 35a of the rear member 35 and a rear end portion 31a of the rear frame 31, and a rear bumper beam 37 connected to the rear end portion 31a of the rear frame 31.

The vehicle body frame 11 carries a damper stiffener 38 disposed on a top portion 33a of the rear wheel arch 33, a filler pipe 39 disposed within the rear wheel arch 33, and a reinforcement frame 40 disposed on the rear wheel arch 33.

The rear frame 31 extends along an inner wall 42 of the rear wheel arch 33 in the front-and-rear direction of the vehicle body. The rear frame 31 is one of members defining a skeleton of the vehicle body frame 11. More specifically, the rear frame 31 extends in the front-and-rear direction of the vehicle body and is disposed closer to a center of width of a vehicle than the reinforcement frame 40.

The floor panel 32 has its outer edge 32a disposed below the reinforcement frame 40. The rear wheel arch 33 is disposed above the rear wheel 17 and has a semicircular shape.

The damper stiffener 38 acts as a skeletal member interconnecting the top portion 33a of the rear wheel arch 33 and the rear pillar 34. The damper stiffener 38 has a side wall 44, a front wall 45 and a rear wall 46. The walls 44, 45, 46 define a generally U-shaped cross-section of the damper stiffener 38. The damper stiffener 38 has a lower edge 38a disposed on the top portion 33a of the rear wheel arch 33 and an upper edge 38b disposed on the rear pillar 34.

Figure 4:
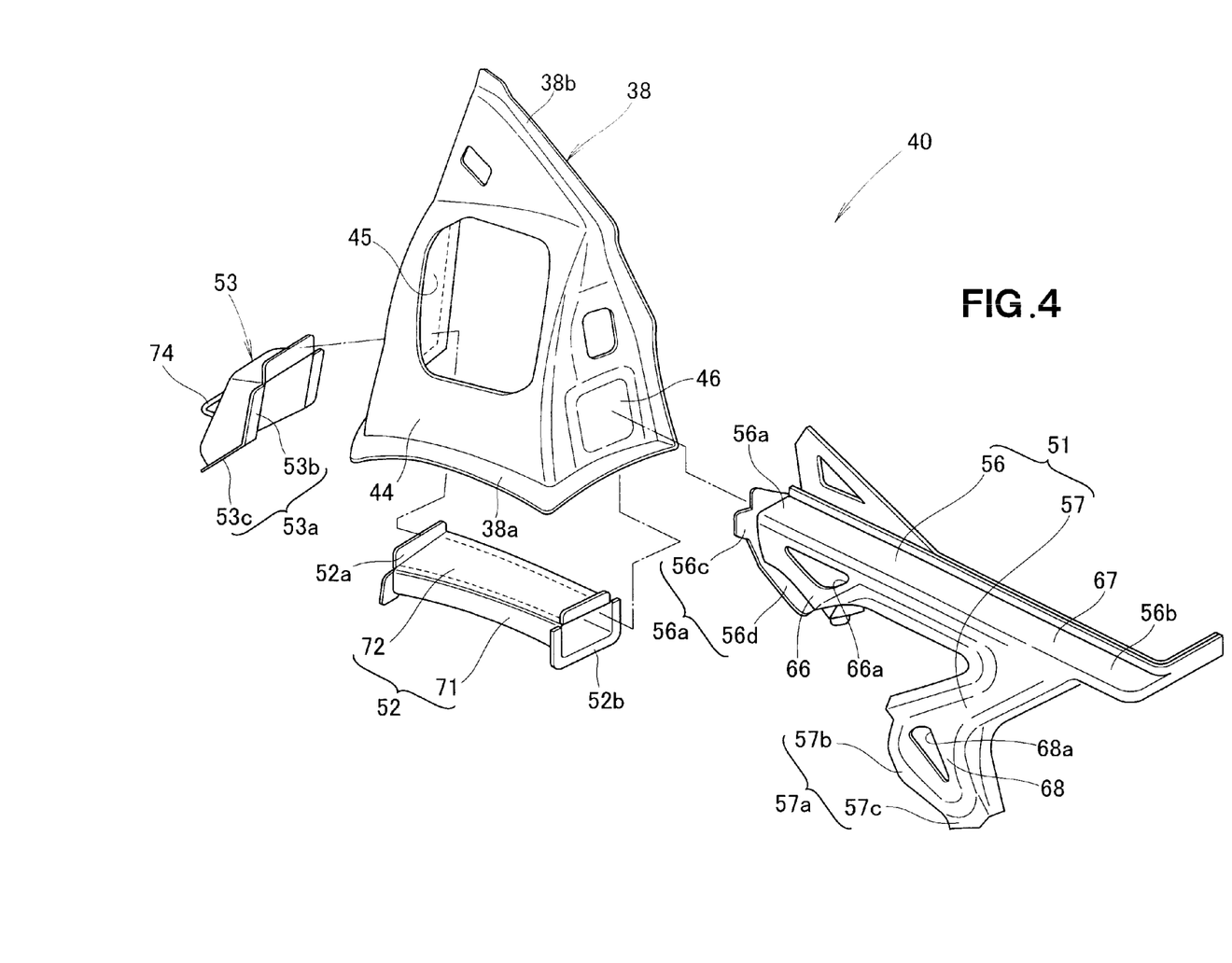
FIG. 4 is an exploded perspective view of the reinforcement frame shown in FIG. 2.

As shown in FIG. 4, the reinforcement frame 40 includes a side assembly 51 (hereinafter referred to as "side member 51") disposed on the rear wheel arch 33, a filler guard 52 disposed forward of the side member 51, a striker transmission member 53 disposed forward of the filler guard 52, and a connection frame 54 (FIGS. 6 and 7) interconnecting the side member 51 and the rear frame 31.

Figure 5:
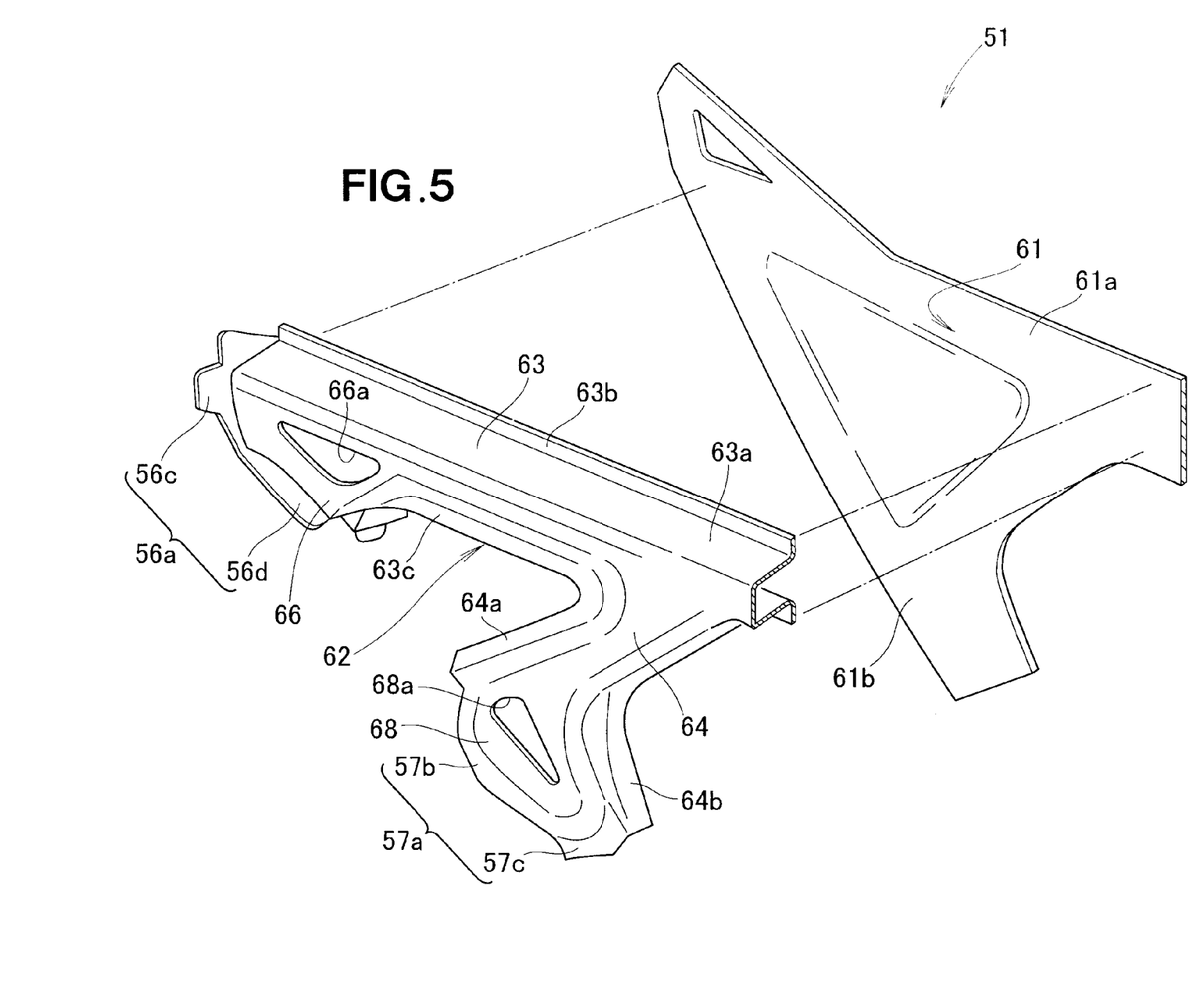
FIG. 5 is an exploded perspective view of a side member shown in FIG. 4.

As shown in FIG. 5, the side member 51 includes a planar side panel 61 of generally sectorial shape, and a projecting side panel 62 joined to the planar side panel 61. The projecting side panel 62 includes an upper panel part 63 extending from the rear wheel arch (FIG. 2) in a rear direction of the vehicle body, and a lower panel part 64 connected to a rear portion 63a of the upper panel part 63.

Figure 8:
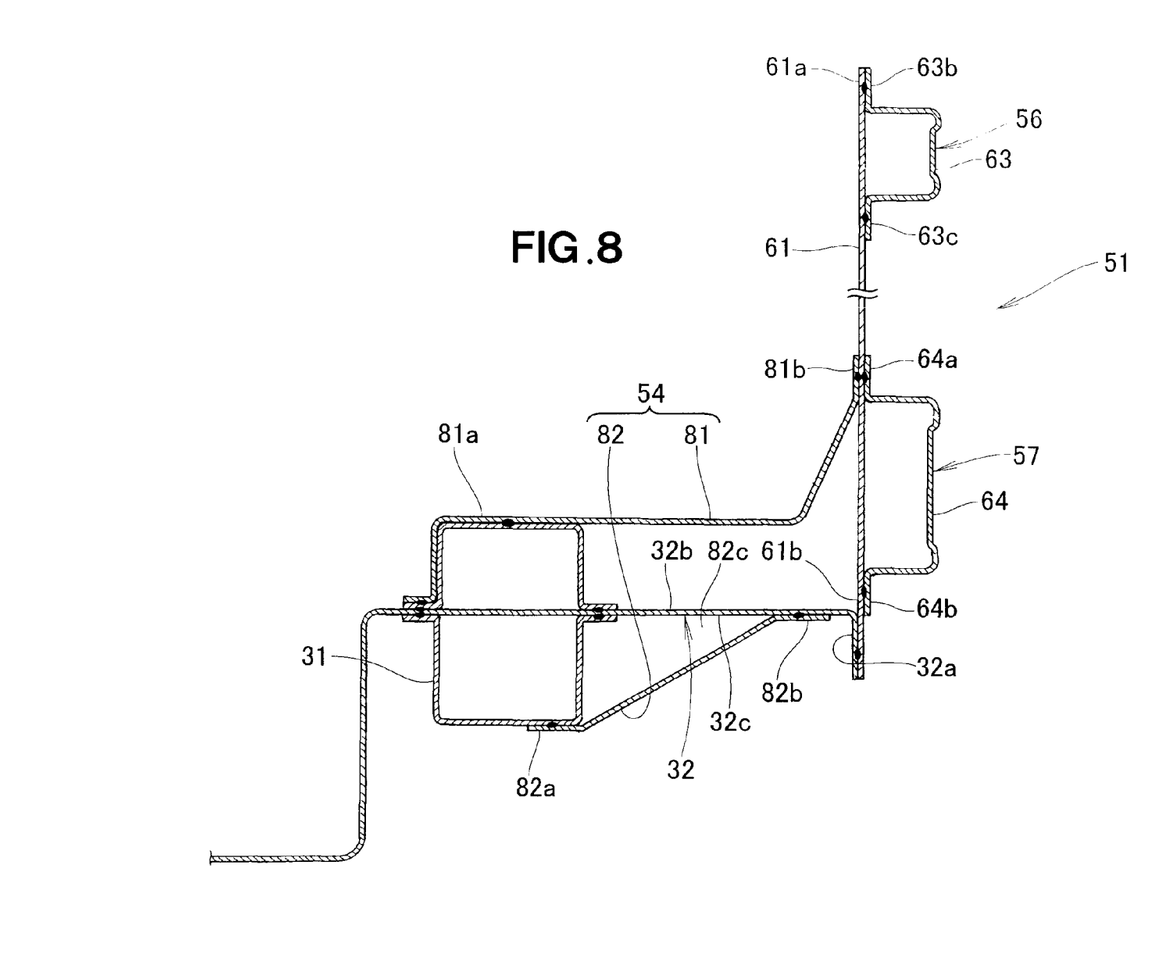
FIG. 8 is a cross-sectional view taken along line 8-8 of FIG. 6.

The upper panel part 63 has a U-shaped cross-section (or a hat-shaped cross-section). The upper panel part 63 has upper and lower flanges 63b, 63c joined to an upper side 61n of the planar side panel 61 to define an upper side part 56 of the side member 51. The upper side part 56 of the side member 51 has a closed cross-section (FIG. 8). The lower panel part 64 has a U-shaped cross-section (or a hat-shaped cross-section). The lower panel part 64 has upper and lower flanges 64a, 64b joined to a lower side 61b of the planar side panel 61 to provide a lower side part 57 of the side member 51. The lower side part 57 of the side member 51 has a closed cross-section (FIG. 8).

Turning to FIG. 4, the side member 51 includes the upper side part 56 extending from the rear wheel arch 33 in the rearward direction of the vehicle body, and the lower side part 57 connected to a rear portion 67 of the upper side part 56. The side member 51 is bifurcated to provide the upper side part 56 and the lower side part 57.

As shown in FIGS. 3 and 4, the upper side part 56 of the side member 51 has a front end portion 56a joined to an upper rear portion 33b of the rear wheel arch 33 and the rear wall 46 of the damper stiffener 56 and a rear end portion 56b connected to the rear cross member 36. With the front and rear end portions 56a, 56b thus arranged, the upper side part 56 is disposed on the extended line 25 of the rear door beam 21.

The upper side part 56 has a front portion 66 projecting downward. The downward projecting front portion 66 is connected to the front end portion 56a. The front end portion 56a has an upper edge 56c joined to the rear wall 46 of the damper stiffener 38, and a slanted edge 56d joined to the upper rear portion 33b of the rear wheel arch 33.

The upper edge 56c and the slanted edge 56d provide a larger joining area of the front end portion 56a. This larger joining area allows for firm attachment of the front end portion 56a of the upper side part 56 to the rear wall 46 of the damper stiffener 38 and the upper rear portion 33b of the rear wheel arch 33. The front portion 66 of the upper side part 56 of the side member 51 has a hole 66a. The hole 66a allows for reduction in weight of the side member 51.

The upper side part 56 is disposed on the extended line 25 of the rear door beam 21 with the rear end portion 56b located a distance H above the rear bumper beam 37.

The lower side part 57 of the side member 51 extends obliquely downward from the rear portion 67 of the upper side part 56 toward a lower rear portion 33c of the rear wheel arch 33.

The lower side part 57 has a front portion 68 projecting downward. The front portion 68 includes a front end portion 57a having a lower edge 57b joined to the lower rear portion 33c of the rear wheel arch 33 and a horizontal edge 57c joined to the floor panel 32. The lower edge 57b and the horizontal edge 57c provide a larger joining area of the front end portion 57a. This larger joining area allows for firm attachment of the front end portion 57a to the lower rear portion 33c and the floor panel 32. The front portion 68 has a hole 68a. The hole 68a allows for reduction in weight of the side member 51.

With the front end portions 56a, 57a joined to the upper rear portion 33b of the rear wheel arch 33 and the lower rear portion 33c of the rear wheel arch 33, respectively, the upper side part 56, the lower side part 57 and the rear wheel arch 33 define a generally triangular shape providing firm attachment of the side member 51 to the rear wheel arch 33.

The side member 51 (the upper side part 56 and the lower side part 57) allows for increase in rigidity of the vehicle body structure 10.

The filler guard 52 is disposed on the extended line 25 of the rear door beam 21 and forward of the upper side part 56, i.e., between the upper side part 56 and the striker transmission member 53 (more particularly, between the front and rear walls 45, 46 of the damper stiffener 38). The filler guard 52 includes a guard portion 71 having a U-shaped cross-section and a cover portion 72 closing an opening defined in the guard portion 71.

The guard portion 71 and the cover portion 72 provide a closed cross-section of the filler guard 52. The filler guard 52 has a front end portion 52a joined to the front wall 45 of the damper stiffener 38 and a rear end portion 52b joined to the rear wall 46 of the damper stiffener 38.

The filler guard 52 is disposed laterally outside the filler pipe 39 to protect the filler pipe 39. The filler pipe 39 supplies fuel to a fuel tank (not shown).

The striker transmission member 53 is disposed on the extended line 25 and forward of the filler guard 52, i.e., between the rear striker 74 and the filler guard 52.

The striker transmission member 53 is a box-shaped member opened at its rear end portion 53a facing the damper stiffener 38 and the rear wheel arch 33. The rear end portion 53a of the striker transmission member 53 has an upper edge 53b joined to the front, wall 45 of the damper stiffener 38 and a lower slanted edge 53c joined to an upper front portion 33d of the rear wheel arch 33. The joining of the upper edge 53b and the lower slanted edge 53c to the front wall 45 and the upper front portion 33d, respectively, closes the opening of the rear end portion 53a to provide a closed cross-section formed by the striker transmission member 53, the damper stiffener 38 and the rear wheel arch 38.

The striker transmission member 53 is designed to transmit a load applied thereto to the rear striker 74. The rear striker 74 is disposed in a rear area 12a of the rear opened part 12 by means of the striker transmission member 53. The rear area 12a of the rear opened part 12 is located rearward of the rear door beam 21 as the rear side door 13 is in the closed position. The rear striker 74 engages the lock part (not shown) of the rear side door 13 in the closed position to hold the rear side door 13 in the closed position.

Figure 6:
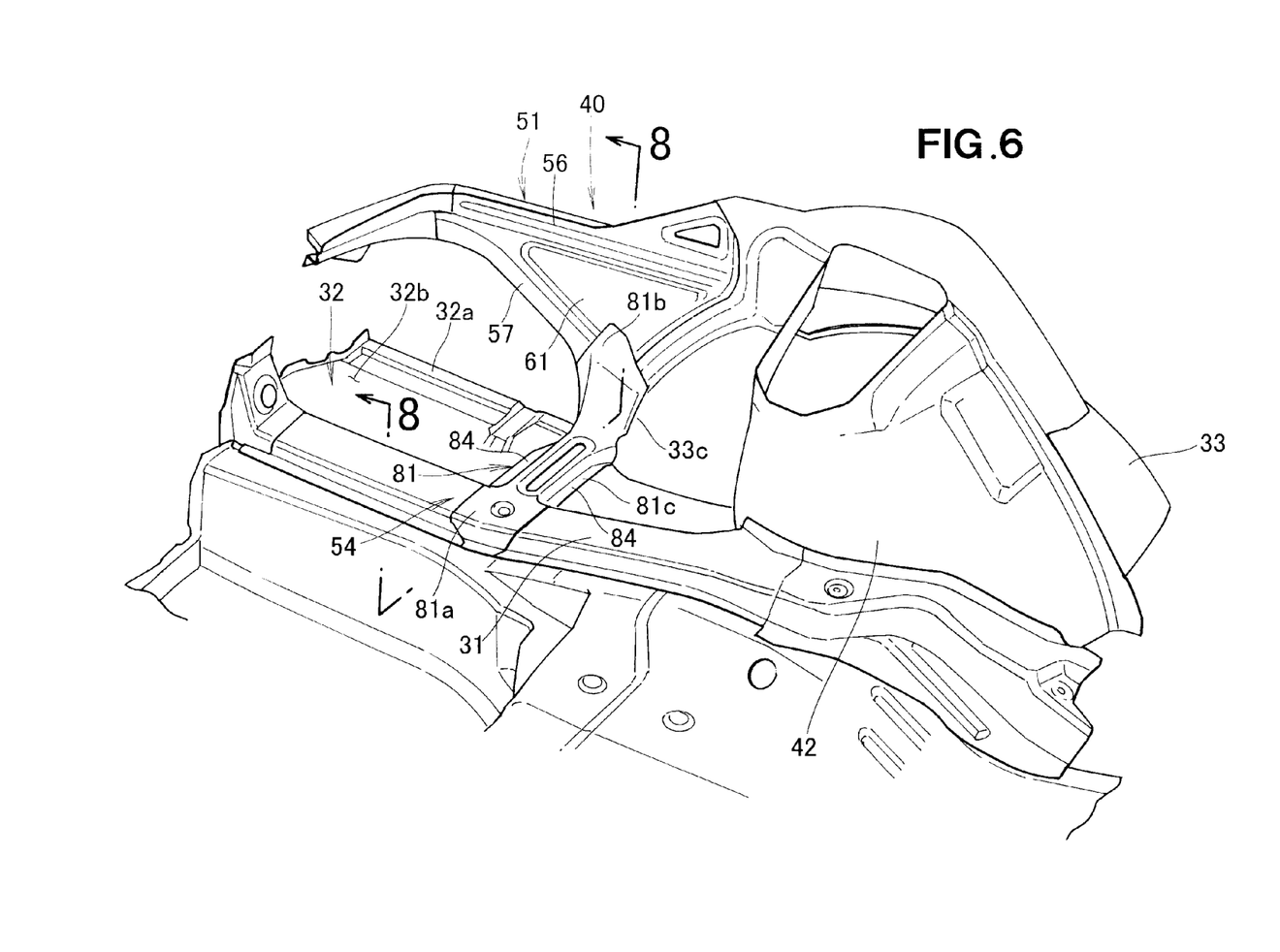
FIG. 6 is a top plan view of a connection frame.
Figure 7:
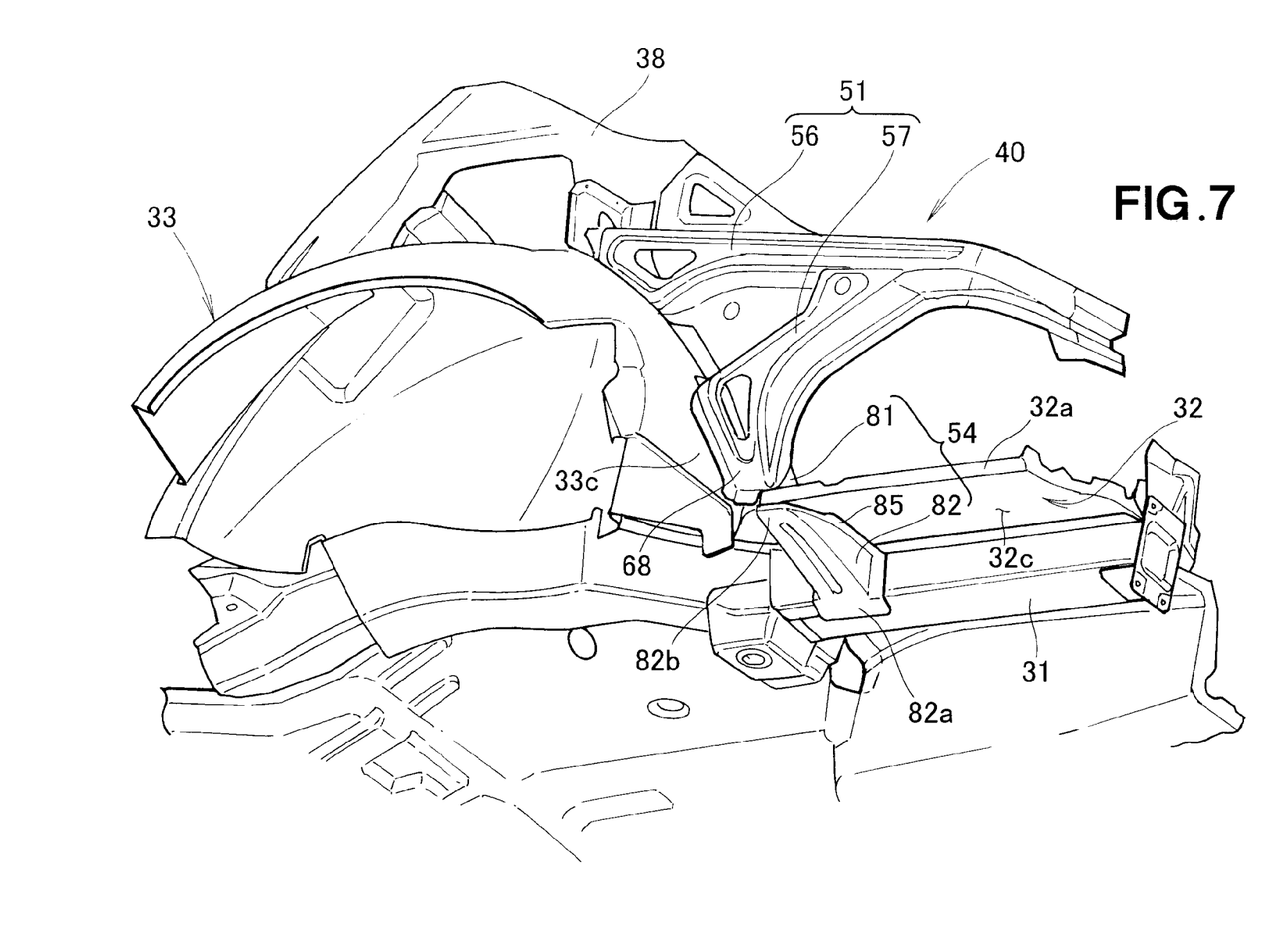
FIG. 7 is a bottom plan view of the connection frame.

As shown in FIGS. 6 to 8, the connection frame 54 extends laterally of the vehicle between the rear frame 31 and the front portion 68 of the lower side part 57 and interconnects the rear frame 31 and the front portion 68. The connection frame 54 includes a top connection frame member 81 disposed on a top surface 32b of the floor panel 32 and a bottom connection frame member 82 disposed on a bottom surface 32c of the floor panel 32.

The top connection frame member 81 shown in FIG. 6 includes an inner end 81a joined to the rear frame 31 and an outer end 81b joined to the front portion 68 (FIG. 7) of the lower side part 57 and the lower rear portion 33c of the rear wheel arch 33. The top connection frame member 81 is opened at its lower part 81c to define a U-shaped cross-section. The top connection frame member 81 has a pair of lower flanges 84, 84 joined to the floor panel 32 to provide a closed cross-section.

The bottom connection frame member 82 shown in FIG. 7 includes an inner end 82a joined to the rear frame 31 and an outer end 82b joined to the outer edge 32a of the floor panel 32. The bottom connection frame member 82 is opened at its upper part 82c (FIG. 8) to define a U-shaped cross-section. The bottom connection frame member 82 has a pair of upper flanges 85, 85 (only rear one of which is shown in FIG. 7) joined to the floor panel 32 to provide a closed cross-section.

The reinforcement frame 40 allows for increase in rigidity of the vehicle body structure 10. The reason the front portion 68 of the lower side part 57 is connected through the connection frame 54 to the rear frame 31 will be discussed with reference to FIG. 10 (b).

Figure 9:
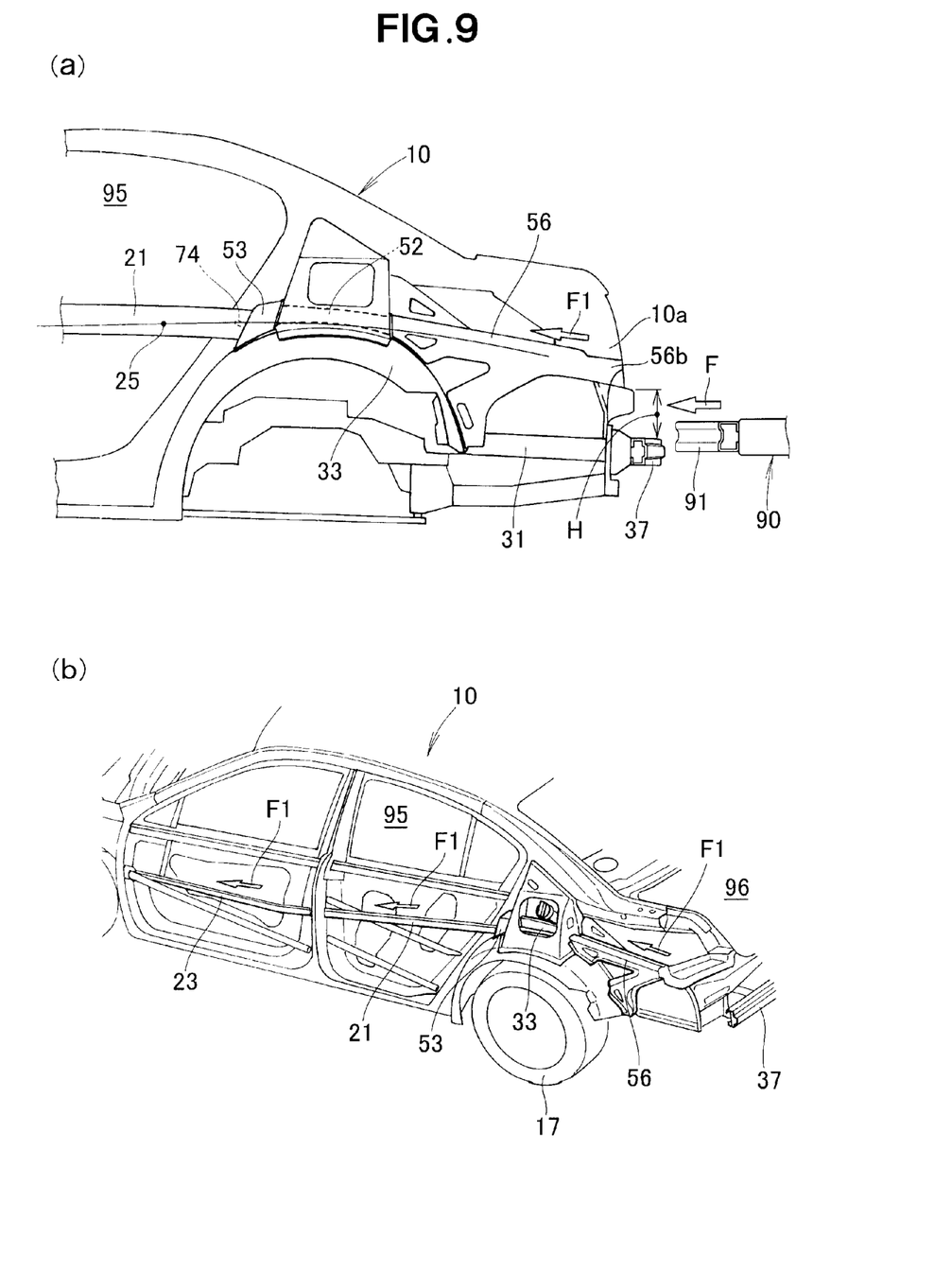
FIG. 9 is a view showing the vehicle body structure transmitting a load applied to a rear part thereto to an upper side part, a rear beam door and a front door beam.
Figure 10:
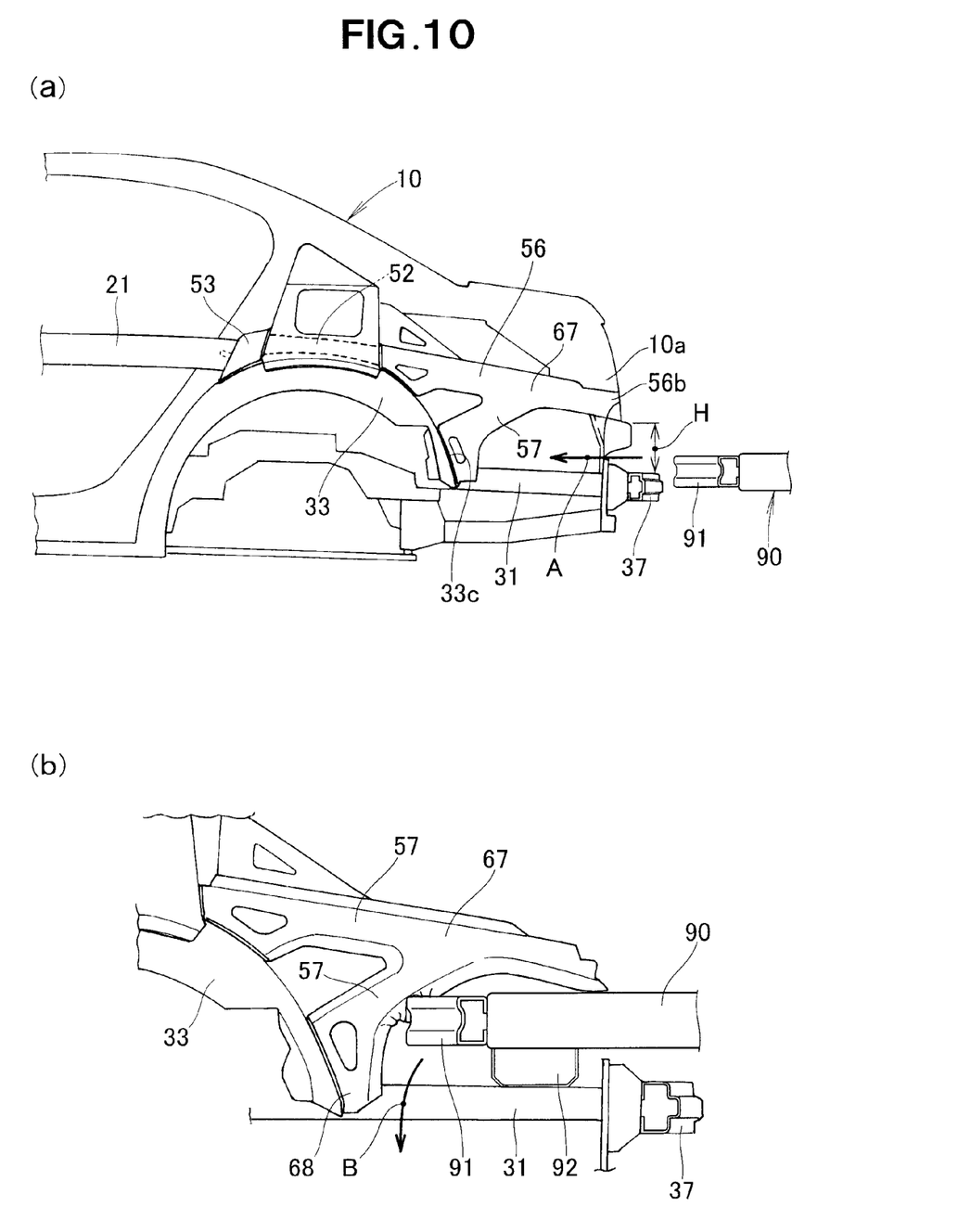
FIG. 10 is a view showing the vehicle body structure preventing another vehicle colliding with the rear part thereof from riding onto the rear part.
Figure 11:
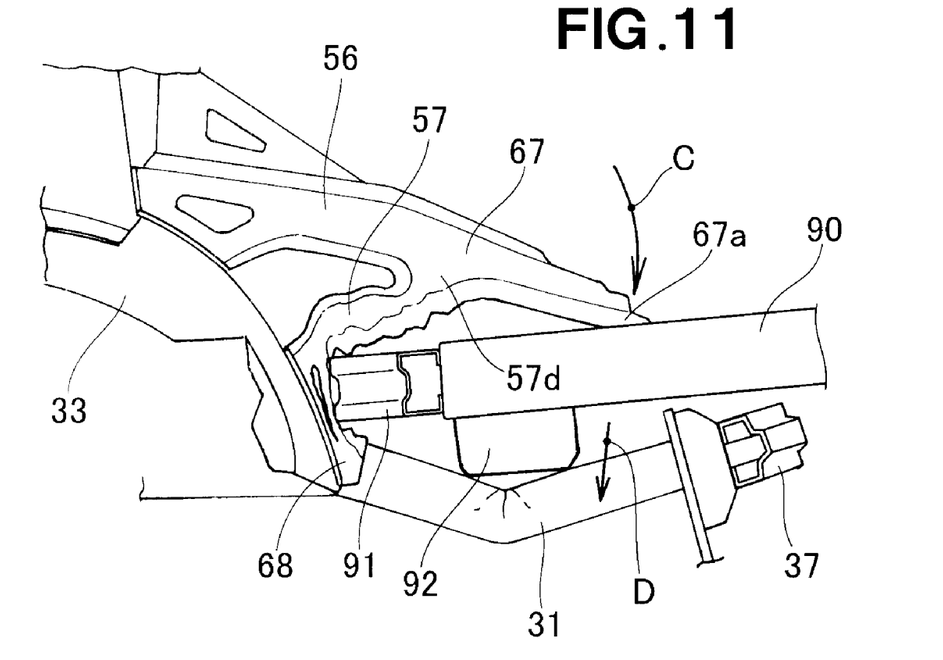
FIG. 11 is a view showing the vehicle body structure absorbing impact energy from another vehicle colliding with the rear part thereof.

FIGS. 9 to 11 show that a vehicle 90 (which includes a front bumper beam 90 located higher than the rear bumper beam 37 of the vehicle body structure 10) collides with a rear part 10a of the vehicle body structure 10. FIG. 9 shows that the vehicle body structure 10 transmits a load, applied to the rear part 10a, to the front door beam 23 through the upper side part 56 and the rear door beam 21.

As shown in FIG. 9(a), the upper side part 56 extends rearward from the rear wheel arch 33 and is disposed on the extended line 25 longitudinally extending from the rear door beam 21 through the front door beam (FIG. 9(b)). The rear end portion 56b of the upper side part 56 is located a distance H above the rear bumper beam 37.

The front bumper beam 91 of the vehicle 90 collides with the rear part 10a. Since the front bumper beam 91 is higher than the rear bumper beam 37 of the vehicle body structure 10, the upper side part 56 is subjected to a load F1 which is one of a load F applied to the rear part 10a.

The load F1 is then transmitted through the filler guard 52, the striker transmission member 53, the rear striker 74 and the lock part (not shown) of the rear side door 13 to the rear door beam 21.

As shown in FIG. 9(b), the load F1 transmitted to the rear door beam 21 is transmitted to the front door beam 23. The rear door beam 21 and the front door beam 23 can efficiently bear the load F1, preventing deformation of a passenger compartment 95. It is thus becomes possible to provide a sufficient space of a trunk 96 because it is not necessary to make frames of the trunk 96 more rigid than is necessary so as to present the deformation of the passenger compartment 95.

FIGS. 10 and 11 show that the vehicle body structure 10 prevents the bumper beam 91 of the vehicle 90 from riding onto the rear part 10a after the bumper beam 91 collides with the rear part 10a.

As shown in FIG. 10(a), the lower side part 57 extends obliquely downward from the rear portion 67 of the upper side part 56 toward the lower rear portion 33c of the rear wheel arch 33.

The bumper beam 91 of the vehicle 90 collides with the rear part 10a of the vehicle body structure 10. Since the front bumper beam 91 is located higher than the rear bumper beam 37 of the vehicle body structure 10, the front bumper beam 91 passes above the rear bumper beam 37, as shown by an arrow A.

As shown in FIG. 10(b), the front bumper beam 91 collides with the lower side part 57. The lower side part 57 then bears the front bumper beam 91, directing the front bumper beam 91 downward, as shown by an arrow B. As a result, the front bumper beam 91 is prevented from riding onto the rear part 10a (i.e., the rear wheel 17 (see FIG. 9(b)).

As shown in FIG. 11, the front bumper beam 91 deforms the lower side part 57 by hitting the lower side part 57. At this time, a rear end portion 57d of the lower side part 57 and the rear end portion 67a of the upper side part 56 are lowered as shown by an arrow C.

The rear end portion 67a of the upper side part 56 then hits a top of the vehicle 90 (i.e., a top of a front side frame of the vehicle 90), thereby pushing the vehicle 90 (the front side frame of the vehicle 90) downward. As a result, a lower bulkhead 92 of the vehicle 90 hits a top of the rear frame 31.

The lower bulkhead 92 is so rigid as to support a cooling member (for example, a radiator). Such a rigid bulkhead 92 deforms the rear frame 31 by hitting the top of the rear frame 31. The deformation of the rear frame 31 absorbs impact energy.

Referring back to FIGS. 6 to 8, the front portion 68 of the lower side part 57 is connected to the rear frame 31 through the connection frame 54. With this arrangement, the front bumper beam 91 which has collided with the rear part 10a of the vehicle 90 is borne by the lower side part 57 shown in FIG. 10(b) and the vehicle 90 is pushed downward deforming the rear frame 31. The deformation of the rear frame 31 absorbs impact energy.

Discussion will be made as to a case where the front bumper beam 91 of the vehicle 90 shown in FIG. 9(a) which is about to collide with the rear part 10a is located at the same level as the rear bumper beam 37 of the vehicle body structure 10. When the front bumper beam 91 located at the same level as the rear bumper beam 37 collides with the rear part 10a, the front bumper beam 91 comes into abutment on the rear bumper beam 37. The rear bumper beam 37 absorbs part of a load F applied thereto upon collision of the front bumper beam 91 with the rear bumper beam 37, and transmits the rest of the load F to the rear frame 31. The rear frame 31 bears the rest of the load F well.

The vehicle body structure 10 bears impact energy with the rear frame 31, like a conventional vehicle body structure, in the case where the front bumper beam 91 is at the same level as the rear bumper beam 37.

It will be understood that various modifications may be made to the vehicle body structure 10. For example, the vehicle body structure 10 may be modified to include the front side door 15 alone although the vehicle body structure 10 includes both the front and rear side doors 15, 13 in the illustrated embodiment.

Either the filler guard 52 or the striker transmission member 53 may be interposed between the upper side part 56 and the rear door beam 21 although both the filler guard 52 and the striker transmission member 53 are interposed between the upper side part 56 and the rear door beam 21 in the illustrated embodiment. It will be appreciated that the upper side part 56 may extend forwardly to such an extent that the upper side part 56 is contiguous with the rear door beam 21.

It will be understood that the upper side part 56 may extend forward without both the filler guard 52 and the striker transmission member 53 being interposed between the upper side part 56 and the rear door beam 21. In this case, the upper side part 56 may be contiguous with the rear door beam 21.

It will be appreciated that the rear striker 74 may be provided directly on the rear area 12a of the rear opened part 12 although the rear striker 74 is provided in the rear area 12a by means of the striker transmission member 53 in the illustrated embodiment.

It will be understood that the configurations of the vehicle body frame 11, the rear side door 13, the front side door 15, the rear door beam 21, the front door beam 23, the rear wheel arch 33, the damper stiffener 38, the filler pipe 39, the reinforcement frame 40, the side member 51, the filler guard 52, the connection frame 54, the upper side part 56, the lower side part 57, the rear striker 74 and the like are not limited to those shown in the drawings but may be modified.

INDUSTRIAL APPLICABILITY

The vehicle body structure of the present invention is suitable for use in an automobile including a side door disposed forward of a rear wheel and a door beam disposed in the side door and extending in a front-and-rear direction of a body of the automobile.

REFERENCE SIGNS LIST

10 vehicle body structure
11 vehicle frame
13 rear side door (side door)
15 front side door (side door)
17 rear wheel
21 rear door beam (door beam)
21*a* front end portion of the rear door beam
23 front door beam
23*a* rear end portion of the front door beam
25 extended line
33 rear wheel arch
33*c* lower rear portion (rear part) of the rear wheel arch
38 damper stiffener
30 filler pipe
40 reinforcement frame
51 side member
52 filler guard
54 connection frame
56 upper side part
57 lower side part
67 rear portion of the upper side part
68 front portion of the lower side part
74 rear striker (striker)

The invention claimed is:

1. A vehicle body structure comprising:
   a side door disposed forward of a rear wheel;
   a door beam disposed in the side door and extending in a front-and-rear direction of a vehicle body;
   a rear wheel arch disposed above the rear wheel;
   a bifurcated reinforcement frame comprising a side member including an upper side part and a lower side part, the upper side part extending from the rear wheel arch in a rearward direction of the vehicle body and disposed on an extended line of the door beam, the lower side part extending obliquely downward from a rear portion of the upper side part toward a rear part of the rear wheel arch; and
   a filler guard disposed on the extended line and between the upper side part and the door beam for protecting a filler pipe.

2. The structure of claim 1, further comprising:
   a striker disposed rearward of the door beam for holding the side door in a closed position when the side door is in the closed position; and
   a striker transmission member disposed on the extended line and between the striker and the filler guard for transmitting a load to the striker.

3. The structure of claim 2, wherein the side door is a rear side door and the door beam is a rear door beam disposed in the rear side door, and wherein the vehicle body structure further comprises a front side door disposed forward of the rear side door and a front door beam disposed in the front side door and extending in the front-and-rear direction of the vehicle body, the front door beam having a rear end portion disposed in the vicinity of a front end portion of the rear door beam and on the extended line.

4. The structure of claim 1, further comprising:
   a rear frame disposed on a side of a center of width of a vehicle and extending alongside the lower side part in the front-and-rear direction of the vehicle body; and
   a connection frame interconnecting the rear frame and a front portion of the lower side part and extending in a widthwise direction of the vehicle.

5. The structure of claim 2, further comprising:
   a rear frame disposed on a side of a center of width of a vehicle and extending alongside the lower side part in the front-and-rear direction of the vehicle body; and
   a connection frame interconnecting the rear frame and a front portion of the lower side part and extending in a widthwise direction of the vehicle.

\* \* \* \* \*